United States Patent
Chang et al.

(10) Patent No.: US 6,584,479 B2
(45) Date of Patent: *Jun. 24, 2003

(54) OVERLAY PRESENTATION OF TEXTUAL AND GRAPHICAL ANNOTATIONS

(75) Inventors: Bay-Wei Chang, Foster City, CA (US); Polle T. Zellweger, Palo Alto, CA (US); Jock D. Mackinlay, Palo Alto, CA (US); Kenneth P. Fishkin, Redwood City, CA (US); Takeo Igarashi, Chigasaki (JP)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/098,942

(22) Filed: Jun. 17, 1998

(65) Prior Publication Data

US 2002/0010707 A1 Jan. 24, 2002

(51) Int. Cl.[7] ............................................. G06F 17/00
(52) U.S. Cl. .................... 707/512; 707/529; 707/531; 707/541; 345/705
(58) Field of Search ............................... 707/512, 517, 707/518, 520, 539, 537, 526, 529, 531, 541; 345/339, 342, 348, 351, 513, 338, 768, 788, 715, 705

(56) References Cited

U.S. PATENT DOCUMENTS

| | | | |
|---|---|---|---|
| 4,495,491 A | 1/1985 | Postl | 340/709 |
| 4,517,660 A | 5/1985 | Fushimoto et al. | 364/708 |
| 4,528,561 A | 7/1985 | Kitamura | 340/745 |
| 4,616,336 A | 10/1986 | Robertson et al. | 364/900 |
| 4,899,292 A * | 2/1990 | Montagna et al. | 707/512 X |
| 5,049,862 A | 9/1991 | Dao et al. | 340/706 |
| 5,055,998 A | 10/1991 | Wright et al. | 364/200 |
| 5,093,907 A | 3/1992 | Hwong et al. | 395/152 |
| 5,095,429 A | 3/1992 | Harris et al. | 364/408 |
| 5,142,669 A | 8/1992 | Inoue et al. | 395/157 |
| 5,146,592 A | 9/1992 | Pfeiffer et al. | 395/157 |
| 5,220,649 A | 6/1993 | Forcier | 395/148 |
| 5,231,577 A | 7/1993 | Koss | 364/419 |
| 5,231,578 A | 7/1993 | Levin et al. | 364/419 |
| 5,231,698 A * | 7/1993 | Forcier | 345/358 |
| 5,245,702 A | 9/1993 | McIntyre et al. | 395/164 |
| 5,371,675 A | 12/1994 | Greif et al. | 364/419.1 |

(List continued on next page.)

OTHER PUBLICATIONS

Alexander, J.; Asmuth, C.; Winarsky, N. "The Samoff Data Analysis and Visualization Project." SPIE; vol. 1259; *Extracting Meaning from Complex Data: Processing, Display, Interaction* (1990); pp. 50–60.

Brown, P.J. "Turning Ideas into Products: The Guide System." *Hypertext '87 Papers*; Nov. 1987; pp. 33–40.

Phelps, T.A.; Wilensky, R. "Multivalent Annotations," *Published in Proceedings of the First European Conference on Research and Advanced Technology for Digital Libraries*; Sep. 1–3, 1997, Pisa, Italy. pp. 1–18.

Shneiderman, B. "User interface design for the Hyperties electronic encyclopedia." *Hypertext '87 Papers*; Nov. 1987; pp. 189–194.

*Primary Examiner*—Joseph H. Feild

(57) ABSTRACT

A primary body of data is displayable on a screen and a supporting body of data is relatable to an annotation tag present in the primary body of textual data. An annotation tag having a predetermined size in the primary body of data is selected, and negotiations ensue between the primary body of data and the supporting body to determine a space into which the supporting body of data can be fitted while maintaining a substantially unobstructed view of the primary body of data. Generally, this negotiated space is sized larger than the original predetermined size of the annotation tag. An animation sequence is used to position the supporting body of data in the negotiated space.

11 Claims, 15 Drawing Sheets

```
      ⎧ But soft! What light through yonder window breaks?
      ⎪ It is the East, and Juliet is the sun!
      ⎪ Arise, fair sun, and kill the envious moon,
  110 ⎨ Who is already sick and pale with grief
      ⎪ That thou her maid art far more fair than she.    ⸺118
      ⎪    the moon here is thought of as Diana,
      ⎪    goddess and patroness of virgins
      ⎩ And none\but fools do wear it. Cast it off.
                 ⸺116
```

U.S. PATENT DOCUMENTS

| | | | | |
|---|---|---|---|---|
| 5,390,295 A | * | 2/1995 | Bates et al. | 345/348 X |
| 5,398,310 A | * | 3/1995 | Tchao et al. | 707/512 X |
| 5,416,895 A | | 5/1995 | Anderson et al. | 395/148 |
| 5,428,733 A | * | 6/1995 | Carr | 345/338 X |
| 5,434,965 A | | 7/1995 | Matheny et al. | 395/159 |
| 5,459,488 A | | 10/1995 | Geiser | 345/173 |
| 5,559,942 A | * | 9/1996 | Gough et al. | 707/512 X |
| 5,577,188 A | | 11/1996 | Zhu | 395/326 |
| 5,579,471 A | * | 11/1996 | Barber et al. | 345/348 |
| 5,581,681 A | | 12/1996 | Tchao et al. | 395/804 |
| 5,581,682 A | * | 12/1996 | Anderson et al. | 707/530 |
| 5,594,641 A | | 1/1997 | Kaplan et al. | 707/531 |
| 5,596,700 A | | 1/1997 | Darnell et al. | 395/340 |
| 5,625,833 A | * | 4/1997 | Levine et al. | 707/512 X |
| 5,634,095 A | | 5/1997 | Wang et al. | 395/326 |
| 5,651,107 A | * | 7/1997 | Frank et al. | 345/589 |
| 5,680,636 A | * | 10/1997 | Levine et al. | 707/512 |
| 5,805,163 A | * | 9/1998 | Bagnas | 345/768 |
| 5,845,288 A | * | 12/1998 | Syeda-Mahmood | 707/104 |
| 5,893,126 A | * | 4/1999 | Drews et al. | 707/512 |
| 5,896,131 A | * | 4/1999 | Alexander | 345/440 |
| 5,953,735 A | * | 9/1999 | Forcier | 345/358 |
| 6,041,335 A | * | 3/2000 | Merritt et al. | 707/512 |
| 6,178,431 B1 | * | 1/2001 | Douglas | 707/512 |
| 6,230,169 B1 | * | 5/2001 | Nagae | 707/512 |
| 6,230,170 B1 | * | 5/2001 | Zellweger et al. | 707/512 |

* cited by examiner

110 {
But soft! What light through yonder window breaks? ⟵ 112
It is the East, and Juliet is the sun!
Arise, fair sun, and kill the envious moon,
Who is already sick and pale with grief
That thou her maid art far more fair than she. ⟵ 114
  the moon here is thought of as Diana.
Be not her maid, since she is envious.
Her vestal livery is but sick and green,
  sickly, bearing the characteristics of greensickness...
And none but fools do wear it. Cast it off.

FIG. 5

110 {
But soft! What light through yonder window breaks?
It is the East, and Juliet is the sun!
Arise, fair sun, and kill the envious moon,
Who is already sick and pale with grief
That thou her maid art far more fair than she. ⟵ 118
**the moon here is thought of as Diana,
goddess and patroness of virgins**
And none but fools do wear it. Cast it off.
⟵ 116

FIG. 6

{120 Four sco~ *why didn't* ~ven years ago our fathers brough~ on this continent, a new nation, conceived in Liberty, and dedicated to the proposition that all men are created equal.

*FIG. 7*

{120 Four sco~ *why didn't say on?* ~ our fathers brough~ *he just save* ~tinent, a new nation, conceive~ *enough* ~nd dedicated to the propositio~ all men are created equal.

*FIG. 8*

{ Lincoln's Gettysburg Address ~132
Four score and seven years ago our fathers
brought forth on this continent, a new nation,
conceived in Liberty, and dedicated to the
proposition that all men are created equal. }
130

{ Lincoln's Gettysburg Address ~132
Four score and seven years ago our fathers
   *a score is twenty*
brought forth on this continent, a new nation
conceived in Liberty, and dedicated to the
proposition that all men are created equal. }
130

140 {
- But soft! What light through yonder window breaks? ─142
- It is the East, and Juliet is the sun!
- Arise, fair sun, and kill the envious moon,
- Who is already sick and pale with grief ─144
- That thou her maid art far more fair than she.
- Be not her maid, since she is envious.
- Her vestal livery is but sick and green,
- And none but fools do wear it. Cast it off.

FIG. 11

140 {
- But soft! What light through yonder window breaks? ─142
- It is the East, and Juliet is the sun!
- Arise, fair sun, and kill the envious moon,
- Who is already sick and pale with grief
- That thou her maid art far more fair than she. ─148
  - the moon here is thought of as Diana, goddess and patroness of virgins
- Be not her maid, since she is envious.
- Her vestal livery is but sick and green,
- And none but fools do wear it. Cast it off.

PROFITEROLES

*To form and bake shells, see Cream Puff*

35 minutes at 400F —1

*Shells, fill as close to serving time with:*

1C whipping cream, 1/2t vanilla, 3T powder sugar, + more

*Creme Chantilly*

*Cover with*

Heat 3/4 C water, 1/2C Sugar, 2oz unsweetened chololate, cool, 1t vanilla

*Chocolate Sauce*

PROFITEROLES

To form and bake shells, see Cream Puff — 182

35 minutes at 400F — 184

Shells, fill as close to serving time with: —

1C whipping cream, 1/2t vanilla, 3T powder sugar, + more

Creme Chantilly

Cover with

Heat 3/4 C water, 1/2C Sugar, 2oz unsweetened chololate, cool, 1t vanilla — 186

Chocolate Sauce

|   | A | B | C | D | E | F |
|---|---|---|---|---|---|---|
| 0 | 20 | 180 | 300 | 20 | 520 SUM(A0:D0) | |
| 1 | 0 | 200 | 120 | 10 | 330 SUM(A1:D1) | |
| 2 | 10 | 220 | 90 | 40 | 360 SUM(A2:D2) | |
| 3 | 20 | 100 | 100 | 0 | 220 SUM(A3:D3) | |
| 4 | 30 | 0 | 80 | 10 | 120 SUM(A4:D4) | |
| 5 | 80 SUM(A0:A4) | 700 SUM(B0:B4) | 690 SUM(C0:C4) | 80 SUM(D0:D4) | 1550 SUM(E0:E4) | |
| 6 | | | | | | |
| 7 | | | | | 1000 | |
| 8 | | | | | 550 E5-E7 | |
| 9 | | | | | | |

*FIG. 19*

|   | A | B | C | D | E | F |
|---|---|---|---|---|---|---|
| 0 | 20 | 180 | 300 | 20 | 520 | |
| 1 | 0 | 200 | 120 | 10 | 330 | |
| 2 | 10 | 220 | 90 | 40 | 360 | |
| 3 | 20 | 100 | 100 | 0 | 220 | |
| 4 | 30 | 0 | 80 | 10 | 120 | |
| 5 | 80 | 700 | 690 | 80 | 1550 | |
|   | SUM(A0:A4) | SUM(B0:B4) | SUM(C0:C4) | SUM(D0:D4) | SUM(E0:E4) | |
|   | =SUM(A0:A4) | | | | | |
| 6 | | | | | 1000 | |
| 7 | | | | | 550 | |
| 8 | | | | | E5-E7 | |
| 9 | | | | | | |

NUMBER THREE FOR MARTIN
By Brian Patrick O'Donoghue
IDOG97

NOME,AK -- Give the credit
to the dogs, said Iditarod
musher Martin Buser, minutes
      Lives in Big Lake, AK
    Biography, Picture, Kennel
218 { Martin spends a large percentage of his time speaking on the care ...
after Blondie and Fearless
trotted down Front Street in
Nome, guiding the Swiss-
expatriate's team to a third
victory in the Last Great Race.

FIG. 24

OVERLAY PRESENTATION OF TEXTUAL AND GRAPHICAL ANNOTATIONS

FIELD OF THE INVENTION

The present invention relates to methods of computer mediated text and graphic display. More particularly, the present invention relates to dynamic display of supplementary textual or graphical annotations over a primary source page.

BACKGROUND AND SUMMARY OF THE INVENTION

Footnotes, headnotes, sidenotes, or other margin-borne annotations are widely employed in books and other printed or electronically viewed publications to present supporting or supplemental information to a primary text in an easily accessible format. Annotations are commonly set in a smaller typesize than the primary text, and may be set in different typefaces, in bold or cursive, or have various formatting peculiarities to distinguish the annotation from the primary text. Ideally, such annotations allow an author to provide a reader with supplementary textual or graphic explanations related to the primary text, while not requiring the reader to unnecessarily change focus (as parenthetical remarks, or lengthy subordinate explanatory clauses, so often do) from the primary text.

Unfortunately, physical limits to the size of margins, typesize, and density of text legible on paper can limit the amount of information one is able to present as an annotation. Annotations may be too large to fit into margin, footnote, or headnote, and even when present can interrupt or slow reading speed. What is needed is an annotation system that allows for viewing of annotations only when desired by a user, with sufficient flexibility to quickly and smoothly present annotations in context to the primary text.

Because of its ability to reformat screen displayed pages of text and graphics, a computer supporting a high quality monitor or flat panel display can greatly expand the range of permissible annotation techniques, allowing authors to somewhat alleviate problems with limited margin space. Accordingly, the present invention provides a method for dynamically presenting a primary body of data displayable on a screen and a supporting body of data relatable to the primary body of data. The primary body of data can include an annotation tag associated with a specific region and referring to the supporting body of data. When a region of user focus at or near the annotation tag is selected in the primary body of data, the supporting body of data is dynamically displayed (as long as user focus is maintained) and data present in the primary body of data is concurrently modified to enhance presentation of the supporting body of data. When user focus changes, the annotation tag is replaced and the primary body of data reverts to its original format.

As will be appreciated, data can include both text and graphics. The present invention encompasses primarily textual applications such as novels, software code, or poetry, as well as primarily graphical applications such as maps, photographs, or geographic information systems. Applications employing substantial amounts of both text and graphics, such as illustrated textbooks, instruction manuals, or spreadsheets, are also suitable candidates for use of the method of the present invention.

Similarly, the annotation tag can be primarily textual, primarily graphical, or some mixture of textual and graphical elements. Contemplated annotation tags include numeric tags (e.g. footnote numerals), greeked or unreadably small interlinear or marginal text, symbols (e.g. an asterisk), hypertext links, or thumbnail graphics or drawings in the margin. In certain preferred applications, the annotation tags can be a very small, yet still readable, version of the supporting body of data. In other applications, lines, curves, or graphical or textual animations can allow a user reviewing a primary body of data to identify the availability of supporting data. While typically a visual cue, in certain applications the annotation tag can be visually imperceptible to the user until a pointer or other indicator of user focus is directed at a region about the annotation tag. In certain applications, annotation tags can be based on auditory or tactile feedback, with, for example, sound, operation of force feedback mice, or tactile displays providing audio or tactile annotations.

User focus on an annotation tag can be determined by tracking the position of a conventional screen displayed pointer maneuverable by mouse, stylus, or keyboard, by use of touch sensitive overlays to a screen, eye or head tracking systems, or any other conventional mechanism for reliably determining a user focus on a region of a screen display. Initiating dynamic display of supporting information at the user focus can be in response to user initiated mouse clicks, keyboard input, finger taps, duration (e.g. mouse cursor held still on or adjacent to an annotation tag for one tenth of a second to about two seconds, with one second being typical), or any other suitable input scheme for confirming a user desire to view supporting bodies of data.

Modification of the primary body of data (in response to user focus) to enhance presentation of the supporting body of data while retaining a unobstructed (or at least minimally obstructed) view of the primary body of data requires accommodating the supporting body of data within the primary body of data. Accommodation requires that the supporting body of data "negotiate" with the primary body of data to determine suitable adjustments to position, orientation, sizing, coloring, spatial morphology, or other typographical or graphical characteristics of the primary or supporting body of data. Accommodation overcomes a major problem associated with conventional hypertext window or "balloon help" techniques. Such annotation techniques simply overlay a small graphic or window over a primary body of data, often covering necessary information in the primary body of data. In contrast, the present invention conducts a negotiation between the primary body of data and the supporting body of data to determine suitable alterations to position, size, color, or spatial morphology of text or graphics that best present salient portions of the primary body of data, while still allowing viewing of the supporting body of data. Ideally, view obstruction of both the primary body of data and the supporting body of data can be minimized, although in certain embodiments partial obstruction of the primary body of data may be necessary to accommodate presentation of salient information.

Accommodation of the supporting body of data can be through overlay or spatial morphing of the primary body of data. An overlay presentation replaces the annotation tag with supporting data, while concurrently identifying the annotated region of the primary body by suitable callouts, lines, markers, or animations that place the annotation in the margin, interline, or interparagraph region, but still direct a user's attention to the related region of the primary body. Alternatively, the region of the primary body subject to annotation can be made visually distinct by a suitable color or font change. This allows, for example, a region of the primary body to be recolored, hue adjusted, or "grayed out", with the supporting data of the annotation positioned to lay on top of the now visually distinct region. Overlay presentations generally do not require repositioning words, lines, or paragraphs, or graphical elements in the primary body of data, instead relying on available spaces (e.g. either "empty" marginal space or space created by "graying out" text) in the primary body of data.

In contrast, spatial morphing of the primary body of data generally requires displacement or differential resizing of lines and words in a vicinity of an annotation tag subject to user focus. The positions of words, lines, paragraphs, or graphical elements in the primary body of data adjust (using an animated transition) as needed to accommodate the supporting body of data. This allows supporting bodies of data to be presented at full readable size, while still retaining the context of the primary body of data. This may include dynamically decreasing typesize of lines in the region near the annotation tag, or providing intraline or interline intercalations of auxiliary symbols, words, or sentences. Words, lines, paragraphs, graphical elements, or margins can be moved to make room for annotations or other supporting data.

As those skilled in the art will appreciate, methods of the present invention can be employed to aid in creating marginal notes, interlineations, graphics, handwriting, and other suitable annotations. A primary body of data is displayable on a screen, permitting a user to select a region of user focus for annotation. Using a keyboard, pen operated touchpad, voice control software, or other suitable input device, the user provides supporting data input for association with the region of user focus. To aid in creating the annotation, the screen displayed body of primary data is modified. Modification can include overlay presentations in which the area to be annotated (i.e. associated with the supporting body of data input by the user) is color highlighted or grayed out, or alternatively, can include spatial morphing presentation techniques in which lines of the primary body of data are moved to accommodate positioning of textual or handwriting input.

Additional functions, objects, advantages, and features of the present invention will become apparent from consideration of the following description and drawings of preferred embodiments.

BRIEF DESCRIPTION OF THE DRAWINGS

FIG. 5 is a sample view of a text display having small-sized text acting as annotation tags;

FIG. 6 is a view of the text display of FIG. 5 after selection of one of the small-sized text, with an expanded textual annotation overlaying lines;

FIG. 7 is a sample view showing a region of a text display being grayed out to support handwritten annotations;

FIG. 8 is a view of the text display of FIG. 7 as the region of grayed text display is expanded to support further handwritten annotations;

FIG. 9 is a sample view of a text display having an underscore as an annotation tag;

FIG. 10 is a view of the text display of FIG. 9 after selection of the annotation tag, with an expanded annotation being intercalated between lines by limited positional morphing of adjacent words in the lines;

FIG. 11 is a sample view of a text display having a star shaped symbol as annotation tags;

FIG. 12 is a view of the text display of FIG. 11 after selection of one of the star shaped annotation tags, with an annotation being intercalated between lines by respacing the lines to accommodate the annotation;

FIGS. 15–18 illustrate various spatial morphing and text resizing possibilities for display of a text;

FIGS. 19–20 illustrate various spatial morphing and text resizing possibilities for display of a tabular spreadsheet;

FIGS. 23–24 illustrate multiple nesting links for progressive display of annotation information.

DETAILED DESCRIPTION OF THE DRAWINGS

Figure 1:
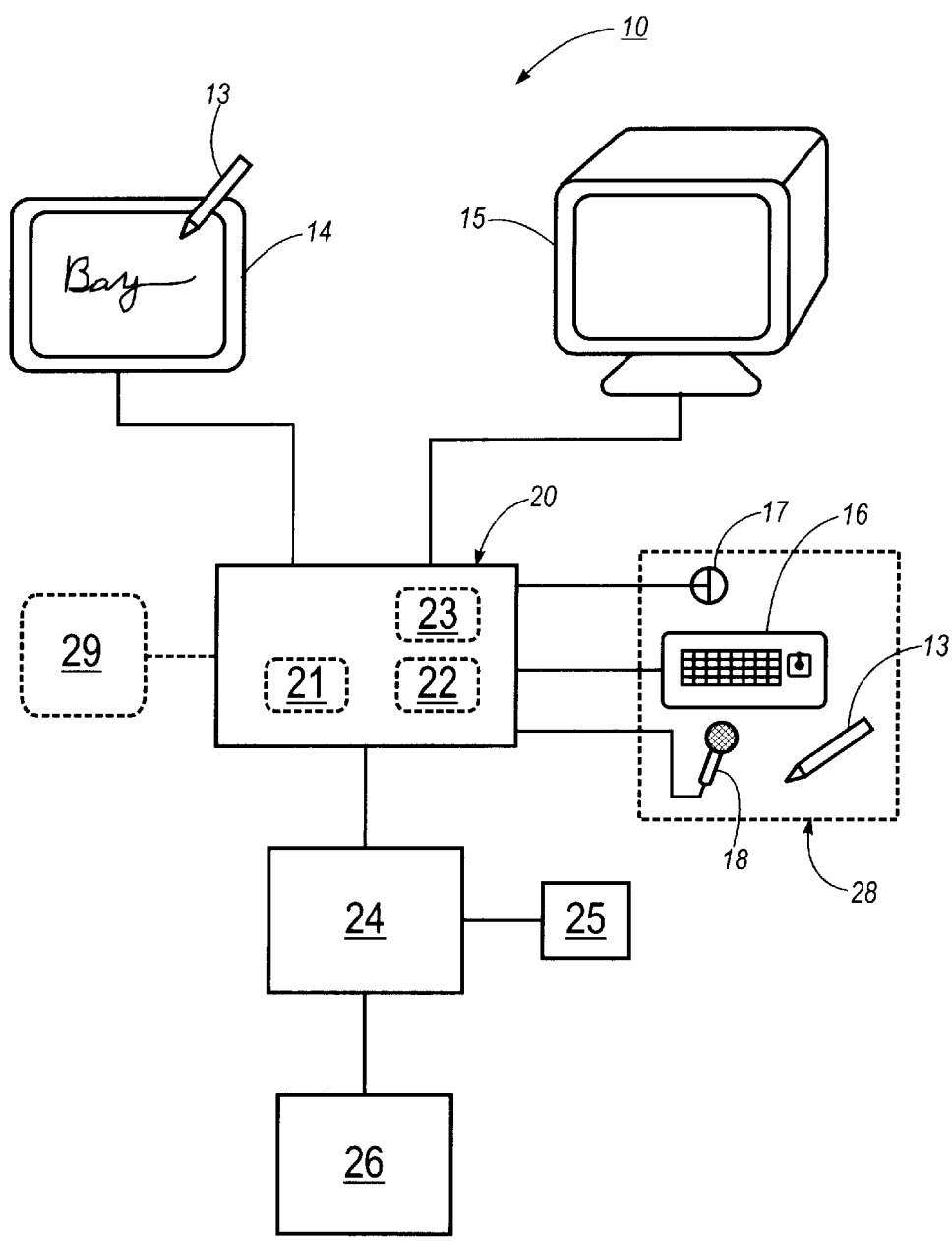
FIG. 1 is a schematic view of a computer and electronic display system suitable for operation of the present invention.

As illustrated with respect to FIG. 1, a computer system 10 includes a computer 20 connected to at least one of a cathode ray tube (CRT) monitor 15 or flat panel display 14. The computer 20 is a conventional personal computer or workstation suitable for running commercial or custom software applications in accordance with the present invention, and includes a processor 21, electronic memory 22, and long term storage 23. Input module 28 provides input to computer 20 by pen device 13, conventional keyboard 16, two or three degree of freedom mouse device 17, pen based or gestural input, paper scanning input, microphones 18 for audio input, or any other supported input mechanism. In addition to visual display output through monitor 15 or flat panel display 14, various non-visual computer output is possible with output module 29, which may include but is not limited to audio output, tactile output, force feedback output (with force feedback mice or joysticks), text and graphics printers, or any other suitable output mechanism. The computer 20 can be connected by local network 24 with associated operating or archival storage 25, and can be further connected to any conventional internetwork 26 for retrieval or dissemination of data.

For purposes of the present invention, one can use high quality CRT monitors, passive or active matrix liquid crystal flat panel displays, various plasma, electrooptical, or microoptomechanical displays, or any other conventional visual display as a display 14 and 15. Good results are obtained by use of CRT monitors that can support 1280 by 1024 pixels. Even better results can be obtained by use of amorphous silicon, active matrix flat panel displays, such as sold by dpiX, Inc. of Palo Alto, Calif. For example, one suitable dpiX flat panel display has a 13.5 inch diagonal size, with viewable display area of 276 mm by 200 mm, and 3072 by 2240 pixels to support a resolution of about 300 dpi with 16 gray levels. Such high resolution displays are capable of legibly presenting textual information with a font pitch as low as 3 points, although 4 or 5 point text is more typically used as a lower limit of font size to minimize eyestrain. These displays can be connected to a PCI controller card coupled to computer 20, and currently are supported under the Windows NT computer operating system. As will be appreciated, any of the foregoing displays can be used in conjunction with various absolute or relative position sensitive touchpads or writing tablets (which may optionally overlay the display or be separately connected to computer 20) to allow direct annotation of the screen through conventional pen-based input techniques.

Figure 2:
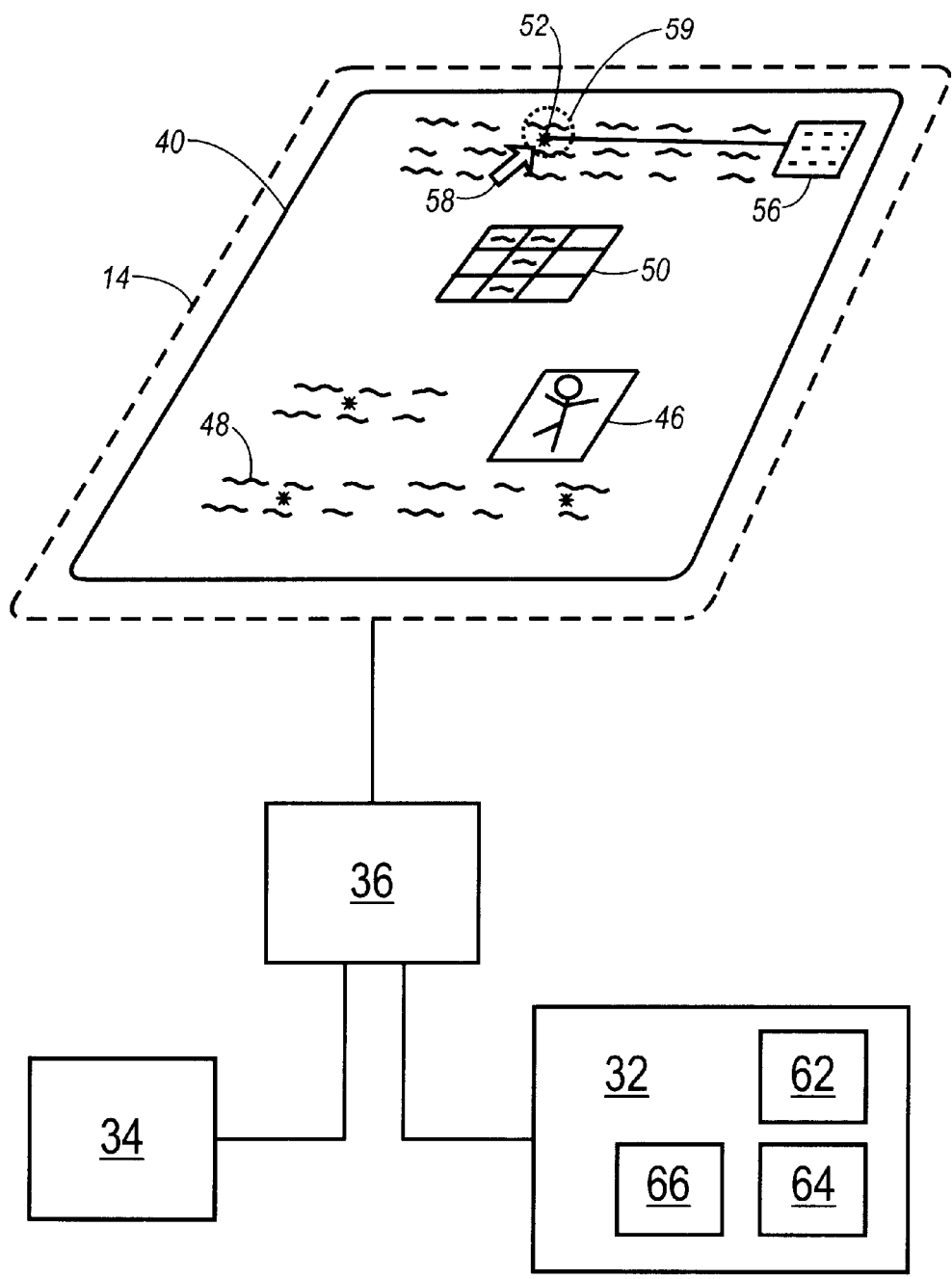
FIG. 2 is a schematic view illustrating a text and graphics display view, a visual representation of a primary body of data, and a visual representation of a supporting body of data capable of being integrated with primary body of data to together provide the text and graphics display view.

As seen in FIG. 2, a flat panel display 14 (previously illustrated in FIG. 1) presents a computer-controlled graphical and textual display 40 to a user. The display 40 is created by negotiation (using negotiation module 36, a software module executing on computer 20 of FIG. 1) between a primary body of data (represented by box 34) and a supporting body of data (generally represented by box 32, with supporting data derived from various sources of data 62, 64, or 66). As can be seen with reference to FIG. 2, the display 40 includes text 48 and graphics 46, tables 50, and various annotation tags (including annotation tag 52). The annotation tag 52 (which is associated with textual data from one of sources of data 62, 64, or 66) can be selected by moving a mouse operated cursor 58 into a region of user focus 59, initiating an animated launch sequence that results in display of a "callout" textual annotation 56. The expansion animation typically takes anywhere from about a quarter second to about two seconds, sufficient for allowing a user to keep visual track of the expanding annotation and maintain proper contextual focus. When user focus changes by movement of the mouse cursor, the annotation tag is replaced and the primary body of data reverts to its original format by a reverse, contracting animation. As will be appreciated, the animation speed can be fully controllable, with high speed "pop-up" display annotations being presented for brief annotations, and longer animations being used for more complex annotations positioned far from the annotation tag.

As will be appreciated, data shown in the display 40 can include text, graphics, or mixtures of textual and graphical elements (such a spreadsheet table 50 of FIG. 2). The present invention encompasses display of a primary body of data 34 that may be text such as electronic mailnotes, novels, software code, or poetry, as well as graphical data such as maps, photographs, or geographic information systems. Applications employing substantial amounts of both text and graphics, such as illustrated textbooks, instruction manuals, or spreadsheets, are also suitable display candidates.

Supporting data 32 can include annotations consisting of a brief explanation positioned in the margin or between the lines of the displayed primary body of text. An annotation can include a description of a hypertext linked destination, an actual excerpt from the linked destination, the relationship of the linked destination to the source material, an annotation on the source material, meta-information such as author and creation date, hyperlink popularity or recommendation data, and combinations of these as well as other information. Authored annotations may include footnotes, cross-references, parenthetical statements, bibliographic references, current section, page numbers, figures, tables, sidebars, tables, copyright, or definitions. Personal annotations can include corrections, additions, deletions, notes, reviewer's comments, or bookmarks within a page. Hierarchical information such as mathematical proofs, outline subheadings, tables of contents, diagram callouts, or step-by-step instructions may also be suitable for some embodiments of the invention. In certain embodiments, logical or relational structures such as may be provided by character or paragraph formatting, or spreadsheet constraint graph information, can be used to enhance understanding of the primary body of data 34.

Similarly, the annotation tag can be primarily textual, primarily graphical, or some mixture of textual and graphical elements. Contemplated annotation tags include numeric tags (e.g. footnote numerals), greeked or unreadably small interlinear or marginal text, symbols (e.g. an asterisk or star shaped symbol) or thumbnail graphics or drawings in the margin. In certain preferred applications, the annotation tags can be a very small, yet still readable, version of the supporting body of data. For example, the annotation can be a clipped version of the supporting body of data, showing just the first line or first few words as 3, 4, or 5 point type, when the primary body of data is presented as 12 point type. During scaling animation, as the supporting body of data becomes more salient, the font scales up gradually over the course of a second or two, showing more and more lines in an increasing font point size. Alternatively, the information can be summarized in the annotation tag; for example, showing a summary phrase or title taken from the supporting body of data. Again, as the supporting material scales up in response to user focus, the summary is replaced with the full text.

In certain applications the annotation tag can be visually imperceptible to the user until a pointer or other indicator of user focus is directed at a region about the annotation tag. For example, annotation tags can be based on auditory or tactile feedback such as may be provided by non-visual output module 29 of FIG. 1, with, for example, sound, operation of force feedback mice, or tactile displays providing audio or tactile annotations.

In addition to displayed mouse or keyboard controlled pointers or cursor 58, user focus can be determined by use of input module 28 and any optionally associated touch sensitive overlays to a screen display, eye or head tracking systems, audio input, or any other conventional mechanism for reliably determining a region of a screen display. Initiating dynamic display of supporting information at the user focus can be in response to user-initiated mouse clicks, keyboard input, finger taps, duration (e.g. mouse cursor held still on or adjacent to an annotation tag for about one tenth of a second to about two seconds, with one second being typical), or any other suitable input scheme for confirming a user desire to view supporting bodies of data.

As those skilled in the art will appreciate, modification of the primary body of data (in response to user focus) to enhance presentation of the supporting body of data requires accommodating the supporting body of data within the primary body of data. Accommodation requires that the supporting body of data "negotiate" with the primary body of data (using negotiation module 36) to determine suitable adjustments to position, orientation, sizing, coloring, or other typographical or graphical characteristics of the primary or supporting body of data. A brief animation can be displayed after a user indicates interest in an annotation tag, typically involving expansion of the annotation and concurrent overlay or spatial and positional morphing of the displayed primary body of data.

Advantageously, accommodation allows supporting data to be presented at full readable size, while still retaining the context of the primary data. In effect, methods in accordance with the present invention mediate the relative salience of primary and supporting data. In the beginning, the primary data is the focus and takes up most of the space and most of the user's attention. The supporting data is hinted at by graphical cues (e.g., an annotation tag). When the user focuses on the supporting data, it will change itself graphically to become more salient by, for example, increasing in size, moving to a prominent location, or being displayed in color or boldface. The primary data concurrently adjusts itself to become less salient by, for example, decreasing in size, moving away from the center, or fading to a lighter hue or gray level. As will be appreciated, multiple levels of saliency can be supported, with additional second-level supporting data linked to first-level supporting data (such as may be found, for example, in a hyperlinked document) becoming more salient than both the primary data and a first level supporting data when selected by user focus.

As will be appreciated, the specific implementations and design parameters used during negotiation between the primary body of data and the supporting body of data is dependent on the particular application and is an area of graphical design. The primary body of data and supporting body of data can be modified by various overlay techniques in which the primary body of data does not substantially change its original size, space, or position, or by various spatial morphing techniques in which the primary body of data does substantially change its original size, space, or position. Overlay techniques advantageously minimize disorientation of the user by minimizing changes to the displayed primary body of data, while spatial morphing techniques can enhance recognition of the supporting body of data and generally allow more information from both the primary body of data and supporting body of data to be concurrently presented on a display.

To aid understanding of the present invention, various strategies for selectively modifying the primary and supporting body of data can be used, including making space by modification of:

1) Position, with primary body of data moved out of way; and supporting data takes its place.
2) Size, with the primary body of data shrinking down as supporting data concurrently grows up.
3) Color, with the primary body of data changing to a less prominent shade or hue (e.g. "grays out") as supporting data scales up (in size) and becomes a more prominent shade or hue (e.g. "bolded"); visually distinguishing supporting data or even allowing supporting data to overlap the primary body of data.
4) Distortion, with the primary body of data squashed or stretched in vertical or horizontal directions, or otherwise distorted to make room for supporting data.

Space in the primary body of text can be altered in a local area (to produce a lesser overall perturbation), or in a remote area (keeping the local area, presumably the area of interest, more recognizable, and less perturbed). Alterations to the display (e.g. animations of an expanding margin callout or resizing annotation text) can be initiated by use of a pen stylus/mouse to click on the annotation tag to be expanded; by holding the pen stylus/mouse on the annotation tag, which grows to reveal more information taken from the supporting body of data, as well as becoming larger (as long as the pointer continues to stay over it); by moving the pen stylus/mouse pointer over the display so that when it lingers at any one point, the supporting body of data begins to expand (moving point of focus); by having the data remain expanded in response to a mouse click or keyboard input when the pen stylus/mouse moves away (allowing multiple points of user focus); or by any other suitable user initiated and controlled operation.

In certain preferred embodiments, the supporting data may only be available through an internetwork (such as internetwork 26) or is maintained in multiple discrete files on computer 20. This would be the case if supporting data 32 in FIG. 2 was text and graphics present in a separate HTML or other similar format file from the primary body of data 34. In such situations, a conventional "hyperlink" annotation could supply a small font type annotation composed of some data from the hyperlinked site so that a reader could learn something about the destination document before committing to leaving the current source material to go there. A useful variation requires excerpting a small amount of the destination (such as its title or its first sentence) and using that as the annotation. Such annotation links can be manually created, dynamically derived from a title of the hyperlinked destination, the first line, the first paragraph, a small image, a summary provided by the destination document's author, or even provided as an automatic summarization of the destination text. Performance can be enhanced by including specification and system support for partial node fetches, and pre-fetching all dynamically derived link annotation contents as the final step of retrieving a node's source content. Even if the annotation step is occasionally slow, it is guaranteed to be no slower than following the link in a standard way, and it has a cognitive advantage of appearing within the current context rather than requiring a full cognitive shift to the destination.

In addition, hyperlinked annotation tags in accordance with present invention can also contain meta-information about the hyperlink and/or the destination, such as its author, creation date, size, etc. Link popularity and recommendation information could also be valuable to a user in considering whether or not to follow a link. Multiway links that present multiple hypertext URL's in response to user focus are possible, as are nested hypertext annotations that allow the reader to drill down through several nodes of hypertext in order to jump to a deeply buried destination, without taking on the overhead of changing context at each stage. If the destination material is brief enough to fit on the source page in a way that retains readability of the source and the destination, the annotation can subsume the entire destination. In this case, the annotation/destination may be a terminal node of the hypertext (such as a definition or annotation) that contains no further links. Even if the destination contains a substantial amount of supporting data, animated annotation links in accordance with the present invention can support a progressive disclosure approach to presentation. For example, the annotation could begin as a dynamically derived initial subset of the destination. As the user continued to focus on the annotation by leaving a mouse in a vicinity of an annotation tag 59, more and more of the destination would arrive and be displayed as hypertext selectable annotation 56.

Figure 3:
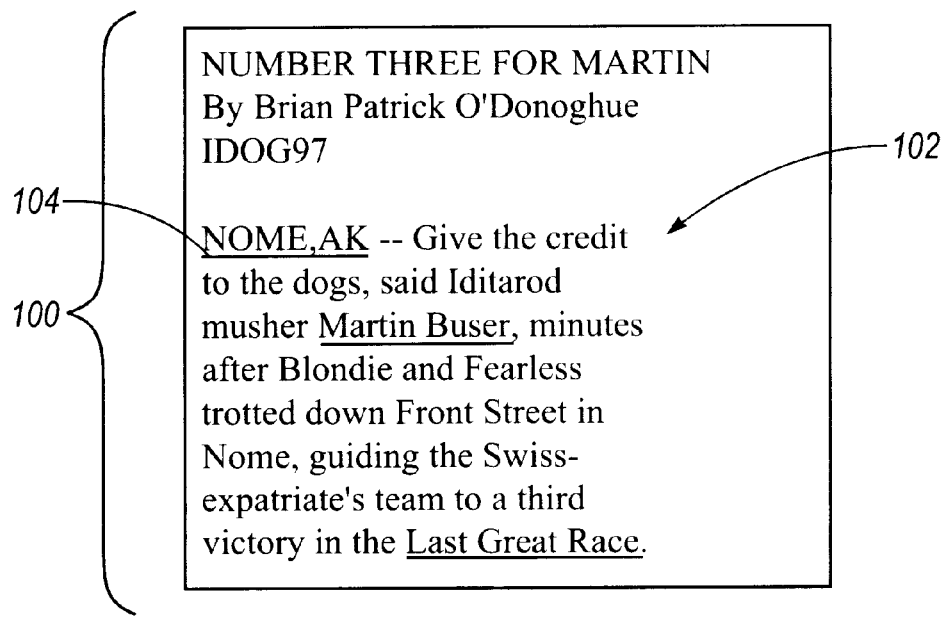
FIG. 3 is a sample view of a text display having small type annotation tags.
Figure 4:
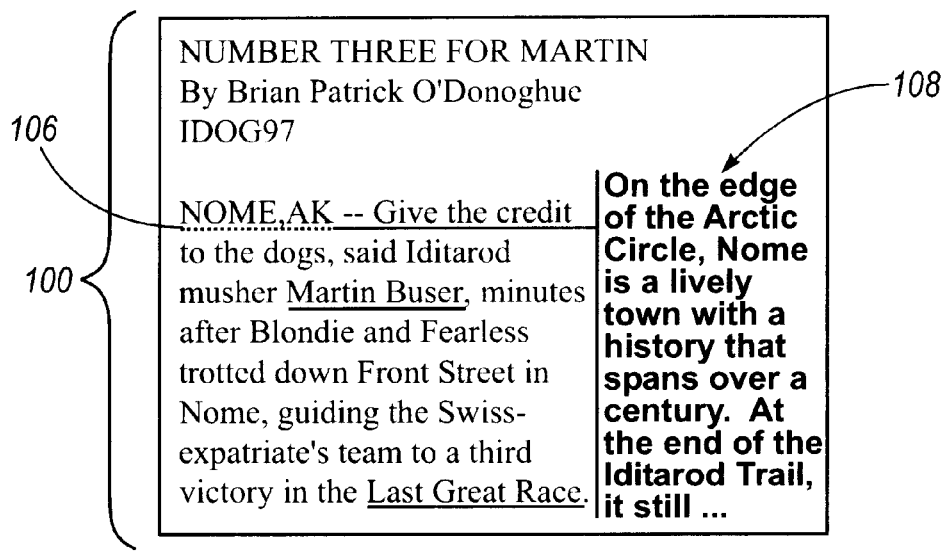
FIG. 4 is a view of the text display of FIG. 3 after selection of one of the small type annotation tags, with an expanded annotation being fitted into the margin.

To better understand various aspects of the present invention, several specific techniques for implementing overlay or spatial morphing of a primary body of data are discussed as follows. For example, FIGS. 3 and 4 illustrate a text sample 100 with a primary body of text 102 having an informational annotation tag 104. Selection of the annotation tag 104 triggers an animation sequence in which the tag expands in size to present an annotation 108 in the margin of the text sample 100. A callout 106 is also displayed as a visual link between the position of the annotation tag with respect to an anchor position in the text 102 and the margin callout 108. Such a margin callout 108 does not alter the primary body of data (i.e. text 102) in order to display the annotation because the callout line travels in between text lines. This technique can allow a good amount of annotation material to coexist with the original layout of the text sample. Although margin callouts sacrifice close proximity to the annotation tag, the animation of the callout line and the subsequent animated expansion of the annotation effectively draws the reader's eye to the annotation, and then back again when the callout line shrinks back to the annotation tag.

To better understand operation of the animation sequence, the following pseudocode describing creation and collapse of a margin callout in accordance with the present invention is supplied.

```
//margin callout effect//
fsn=normal readable font size
set font size to fsn
draw the primary text
fs0=very small font size
set font size to fs0
for each annotation:
    draw the annotation fragment below its anchor text
when mouse is over an annotation:
    //calculate first part of animation, the "line growth"
    (x0, y0)=(x, y) location of annotation
    x1=x location of closest margin
    t=total desired animation time
    f1=fraction of t devoted to line growth
    //set up for animation
    t1=t*f1
    xj=x0
    t0=currenttime
    //animate line "growing" effect, pushing annotation in front of it
    repeat until currenttime>t0+t1:
        xi=interpolate(currenttime-t0, x0, x1)
        erase annotation
        drawline (xj, y0, xi, y0)
        draw annotation in front of line
        xj=xi
    erase annotation
    drawline (xj, y0, x1, y0)
    draw annotation in front of line
    //calculate second part of animation, the "text growth"
    h=line height of annotation text at font size fsn
    n=number of lines of full annotation
    ya=n*h
    y2=y0-(ya/2)
    if x1 is at the right margin:
        x2=x1+small offset
    else://x2 is at left margin
        xa=width of longest annotation line at full size
        x2=x1-small offset-xa
    xp=currentxlocation of annotation
    t2=t*(1-f1)
    t0=currenttime
    //animate text growing effect
    repeat until currenttime>t0+t2:
        ct=currenttime-t0
        fs=interpolate(ct, fs0, fsn)
        (xi, yi)=interpolate(ct, (xp, y0), (x2, y2))
        erase annotation
        set font size to fs
        draw full annotation at (xi, yi)
        drawline (x1, yi, x1, y0-yi+y0)
    erase annotation
    set font size to fsn
    draw full annotation at (x2, y2)
    drawline (x1, y2, x1, y0-y2+y0)
when mouse is no longer over annotation or margin callout:
    reverse above animation
```

As seen in FIGS. 5 and 6, another overlay technique that preserves the layout of a text sample 110 is known as a textual overlay. A textual overlay expands into the space below an annotation tag 114. When the annotation tag 114 is selected, the primary body of text 112 in that space 116 does not move away; but instead fades in color hue or lightens in gray scale as seen in FIG. 6. The annotation tag 114 is then expanded into a full annotation 118 that lies over the grayed out space 116. The difference in brightness of the two layers of text can make the annotation readable while still preserving context with respect to the primary body of data.

To better understand operation of this overlay technique, the following pseudocode describing creation of a grayout effect in accordance with the present invention is supplied.

```
//grayout effect
fsn=normal readable font size
set font size to fsn
draw the primary text
fs0=very small font size
set font size to fs0
for each annotation:
    draw the annotation fragment below its anchor text
when mouse is over an annotation:
    //calculate the overlap area
    (x0, y0)=(x, y) location of annotation
    h=line height of annotation text at font size fsn
    n=number of lines of full annotation
    ya=n*h
    xa=width of longest annotation line at font size fsn
    bbox=rectangle (x0, y0, x0+xa, y0+ya)
    foreach character c in primary text:
        if c is in bbox:
            add c to graychars
    //set up for animation
    gr1=final gray value of overlapped text
    t=total desired animation time
    t0=currenttime
    //animate line "growing" effect, pushing annotation in front of it
    repeat until currenttime>t0+t:
        ct=currenttime-t0
        erase annotation
        gr=interpolate(ct, black, gr1)
        draw graychars with color gr
        fs=interpolate(ct, fs0, fsn)
        set font size to fs
        draw full annotation at (x0, y0)
    //draw final, enlarged annotation state
``` erase annotation
draw graychars with color gr1
  set font size to fsn
  draw full annotation at (x0, y0)
when mouse is no longer over annotation:
reverse above animation As seen with respect to FIGS. 7 and 8, still another gray-out overlay technique facilitates addition of user created textual annotations to a text sample 120. The sample 120 is displayed on an electronic pen sensitive tablet computer that permits a user to handwrite an annotation 128. As seen successively in FIG. 7 and FIG. 8, text 126 underlying the annotation is grayed out to enhance viewability of the annotation. As desired, the added text can later be marked with an annotation tag (not shown) to permit easy retrieval and viewing of the handwritten annotation.

In addition to the various available overlay techniques, spatial morphing techniques that rely on an intercalation, separation, resizing, and repositioning of a primary body of text to accommodate supporting annotations can also be used. For example, as seen in FIGS. 9–10 a text sample 130 includes text 132 having an underscore annotation tag 134. Triggering the annotation tag 134, as seen in FIG. 10, causes surrounding text lines to warp outward, spatially morphing to accept an intercalatory annotation 136.

Similarly, FIGS. 11 and 12 illustrate a text sample 140 that includes text 142 having a star shaped symbol annotation tag 144. Triggering the annotation 144, as seen in FIG. 12, causes surrounding text lines to move apart, spatially morphing by line spacing adjustments to accept an intercalatory annotation 146. To better understand operation of such interline spatial morphing, pseudocode for interline expansion is presented as follows:

```
//interline expansion effect
fsn=normal readable font size
set font size to fsn
draw the primary text
fs0=very small font size
set font size to fs0
for each annotation:
    draw the first line of the annotation below its anchor
        text
when mouse is over an annotation:
    //calculate the amount of expansion needed
    (x0, y0)=(x, y) location of annotation
    ha=line height of annotation text at font size fsn
    na=number of lines of full annotation
    //ya is the height of the annotation text at full size
    ya=na*ha
    n=number of lines of primary text
    //e is the amount to shrink the line height of the primary
        text
    e=ya/n
    h=line height of primary text
    //h1 is the new line height of the primary text
    h1=h-e
    //calculate the new position of each line
    foreach line l:
        origy[l]=y position of l
    y1=y location of first line of primary text
    y=y1
    newy[1]=y1
    la=line number of anchor text with the annotation to be
        expanded for line l starting at line2 up to and including
        la:
        y=y+h1
        newy[l]=y
    y=y+ya+h1
    for line l starting at line (la+1) to last line:
        y=y+y1
        newy[l]=y
    //set up for animation
    t=total desired animation time
    t0=currenttime
    //animate the annotation growing and line expansion
        effect
    xp=x position of primary text
    yoff=y offset of annotation from anchor text
    repeat until currenttime>t0+t:
        ct=currenttime-t0
        foreach line l in primary text:
            erase l
            ly=interpolate(ct, origy[l], newy[l])
            draw line l at (xp, ly)
        erase annotation
        fs=interpolate(ct, fs0, fsn)
        lay=interpolate(ct, origy[la], newy[la])
        set font size to fs
        draw full annotation at (x0, lay+yoff)
    //draw final, enlarged annotation state
    foreach line l in primary text:
        erase l
        draw line l at (xp, newy[l])
    erase annotation
    set font size to fsn
    draw full annotation at (x0, newy[la]+yoff)
when mouse is no longer over annotation:
    reverse above animation
```

Figure 13:
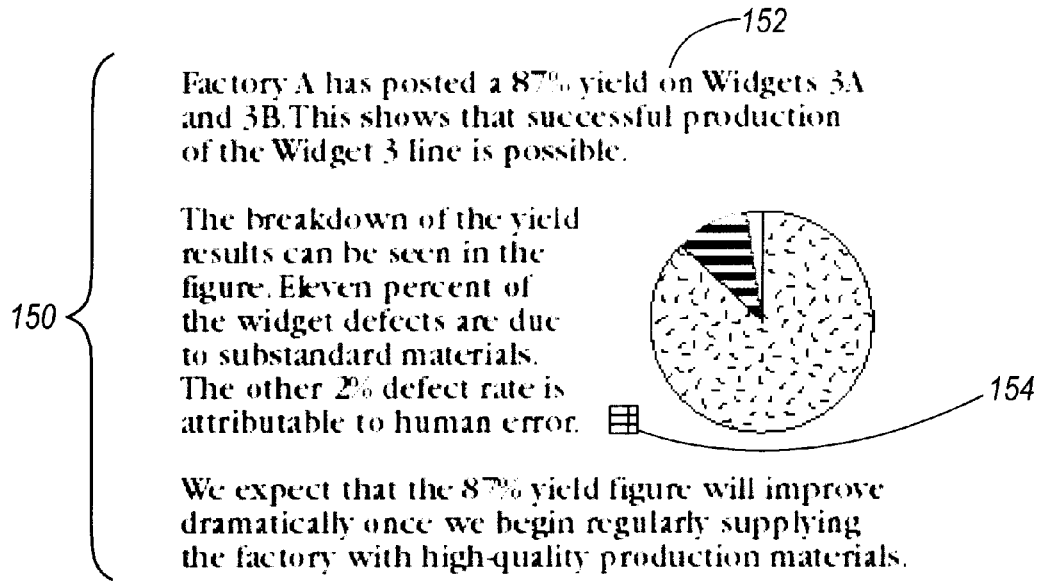
FIG. 13 is a sample view of a text and graphic display having a tabular icon as an annotation tag.
Figure 14:
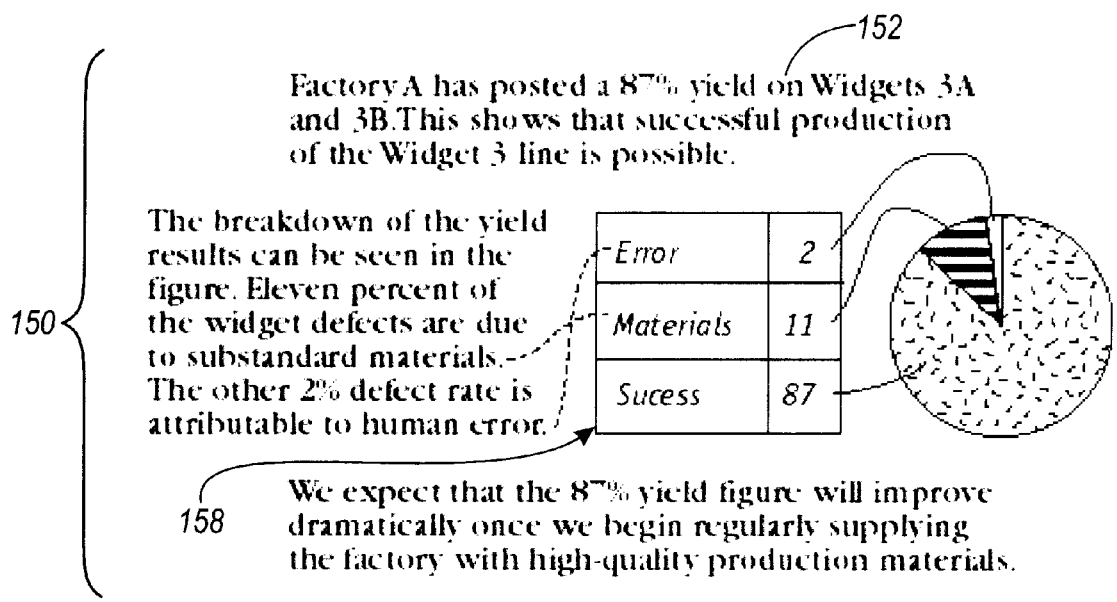
FIG. 14 is a view of the text and graphic display of FIG. 11 after selection of the tabular annotation tag, with an annotating table being intercalated between text and a graphic element by appropriate respacing of the text and the graphic element.

FIGS. 13 and 14 present an example of yet another spatial morphing technique. As seen in FIG. 13, a text sample 150 includes text 152 having a tabular icon annotation tag 154. Triggering the annotation tag 154, as seen in FIG. 14, causes surrounding text and graphics lines to move aside, spatially morphing to accept an intercalatory tabular annotation 146.

Figure 15:
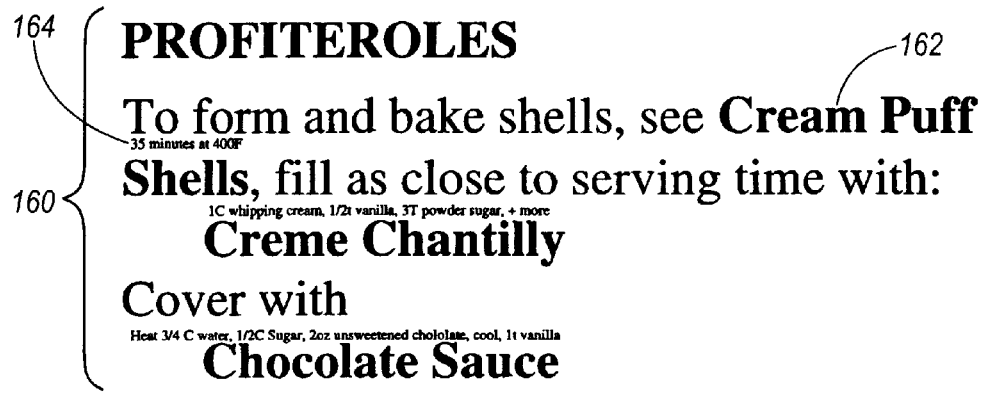
Figure 16:
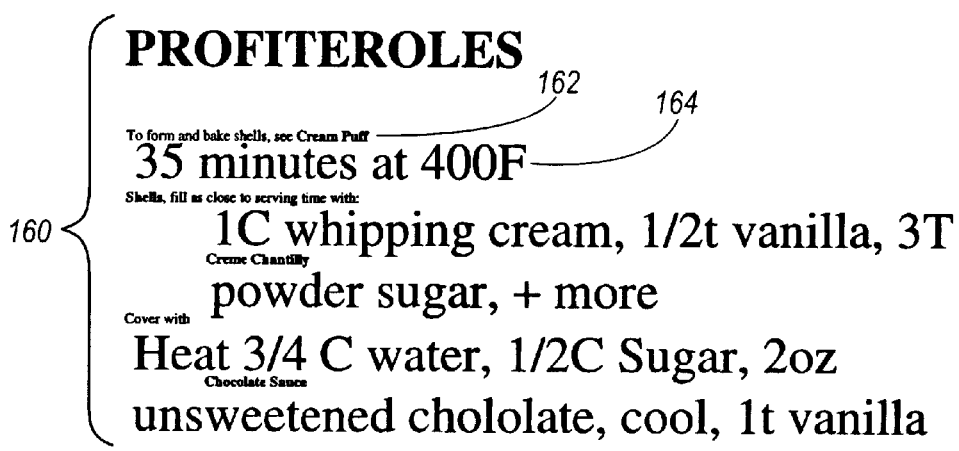

Various spatial morphing techniques are presented in FIGS. 15–19. FIG. 15 illustrates a depiction of a recipe 160 having a body of text 162 and associated annotations 164. As seen in FIG. 16, the relative size of text 162 and annotations 164 can be reversed to accentuate either the ingredients or the recipe needed to prepare profiteroles. As seen in FIG. 17, a depiction of recipe 170 (similar to the depiction of recipe 160) can have a body of text 172 in conjunction with a spatially distorted (squashed) body of text 174. If the line selection is reversed (not shown), the text 172 can be squashed while text 172 is presented in an undistorted form. Similarly, FIG. 18 illustrates a text sample 180 in which a particular line 182 is a subject of user focus, while text line 184 is marginally diminished in size to accentuate the selected line. Lines far from text line 182 (such as text line 186) can remain unchanged in size, matching the size of user selected text line 182.

FIGS. 19 and 20 illustrate operation of the present invention in conjunction with a spreadsheet, a complex arrangement of text, numerical data linked by formulas and constraints, and graphics to define cell layout. As seen in FIG. 19, a spreadsheet 190 can include numeric data 192, graphical elements 193, and formula annotation tags 194 positioned adjacent to numeric data 192. As seen in FIG. 20, when a user focuses on a particular cell (5A) the graphical elements are spatially morphed to separate, leaving a gap into which an annotation 198 can be fitted.

Figure 21:
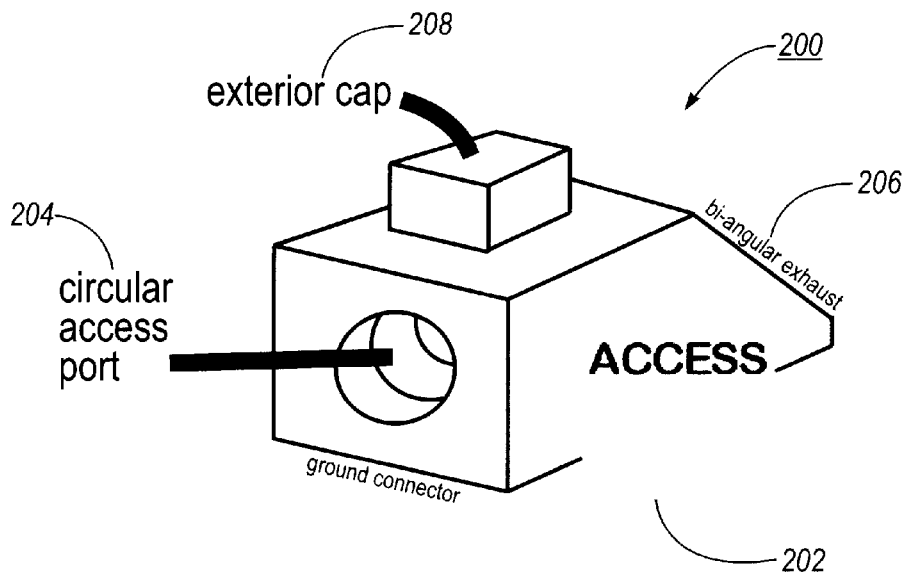
FIGS. 21–22 illustrate various spatial morphing and text resizing possibilities for display of an annotated two dimensional representation of a three dimensional device.
Figure 22:
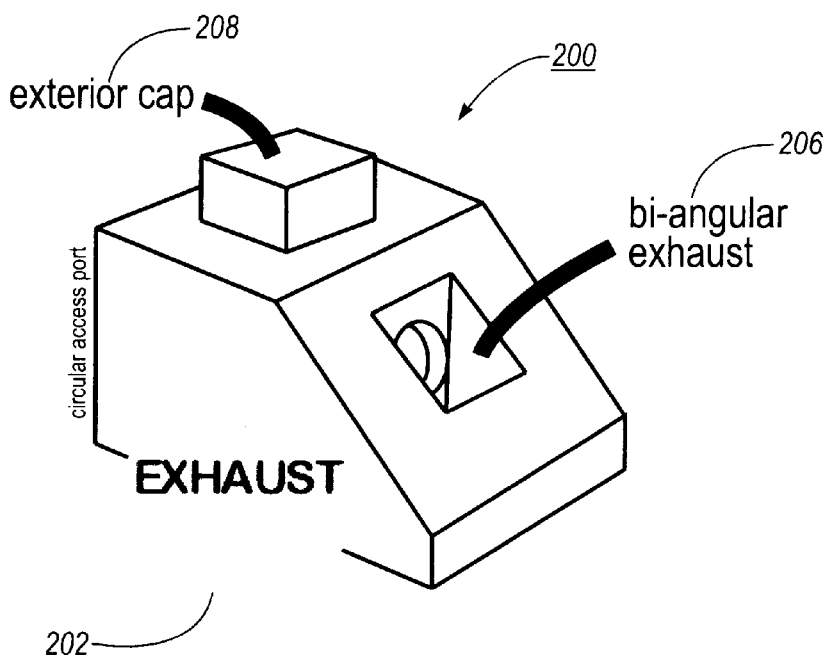

FIGS. 21 and 22 illustrate a complex two dimensional display representation 200 of a three dimensional object. As the object is virtually rotated between the view seen in FIG. 3, and the view seen in FIG. 22, the size of the various annotations 204 and 206 increases or decreases in accordance with the user perspective on the virtual object. When that perspective is essentially unchanged, as is the case with annotations 202 and 208, the annotation remains basically unchanged.

Figure 23:
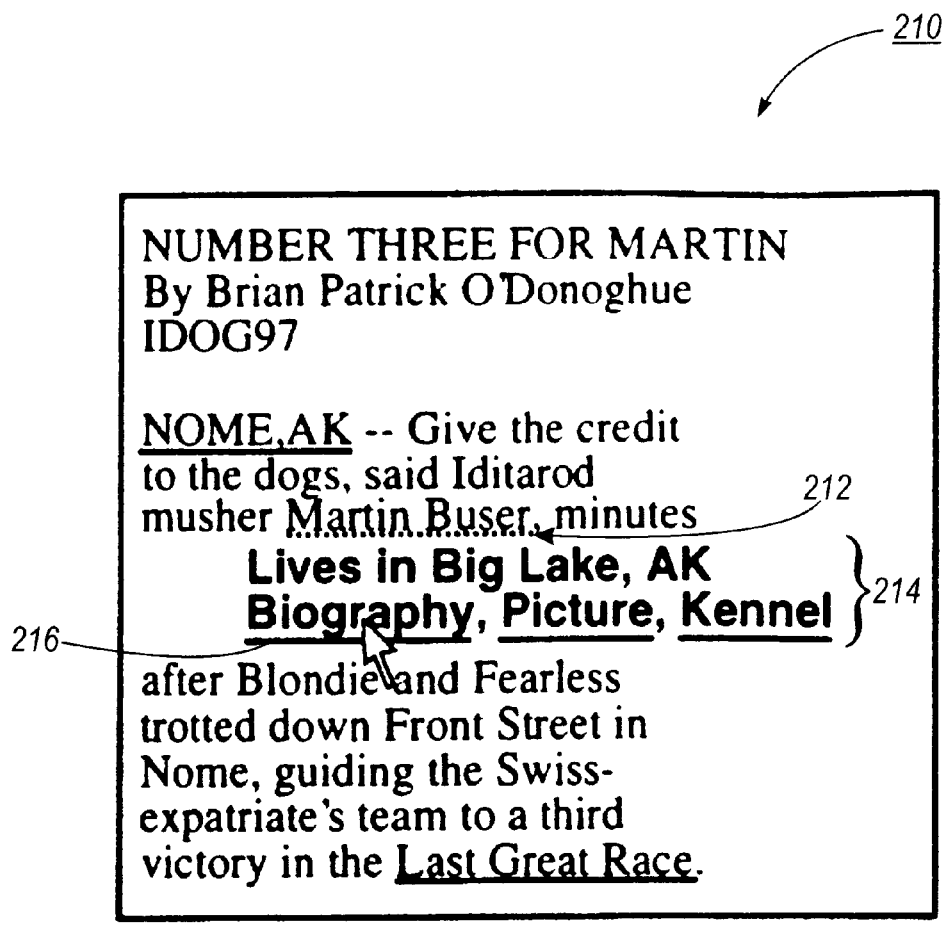

FIGS. 23 and 24 show still another embodiment of the present invention. As seen in FIG. 23, a textual representation 210 supports multiple nesting links functioning as an enhanced hypertext. For example, selection of annotation tag 212 causes text to move apart and accommodate presentation of multiple link 214. As seen in FIG. 24, selection of one of the links (in this case "Biography") opens yet another link related to "Biography". As will be appreciated, the multiple links 214 still remain in view, preserving context during search of the multiple links. To better understand operation of such multiple hypertext links, pseudocode for interline expansion is presented as follows:

```
//fluid hypertext links
//input specification: in addition to the primary text input,
//each hypertext anchor ha specifies the following:
    ha.location=e.g., (line, startchar, length)
    ha.jumpfile=link destination filename (or URL)
    ha.glosstype=one of {simple, dynamic, nestable}
    ha.glossfield=if simple, then actual text of gloss
    if dynamic, then <empty/unused>
    if nestable, then gloss filename
//compute the gloss text, ha.glosstext, from ha.glossfield
if ha.glosstype=simple:
    ha.glosstext=ha.glossfield
else if ha.glosstype=dynamic:
    ha.glosstext=fetch first line or title dynamically from
        ha.jumpfile
    //fetch can be done when the page is loaded,
    //or can wait until gloss is activated
else if ha.glosstype=nestable:
    ha.glosstext=contents of the gloss file
    //gloss file may contain nested anchors
def load_fluid_file (filename):
    clear page
    open (filename)
    read contents
    fsn=normal readable font size
    set font size to fsn
    draw the primary text
    fs0=very small font size
    for each hypertext anchor ha:
        draw_hypertext_anchor(ha)
def draw_hypertext_anchor (anchor):
    draw a solid line under the anchor
    set font size to fs0
    set font visibility to invisible//gloss text is invisible
        until expanded
    draw the associated gloss text below its anchor text
when mouse moves over a visible anchor:
    //preview hypertext link, i.e. show gloss
    change anchor underline style to dotted
    change visibility of all lines of the associated gloss to
        visible
    for each hypertext anchor subha in the gloss:
        draw_hypertext_anchor(subha)
        //only fetch and draw the text for the next level of
            subglosses
    //permits interactive response yet avoids recursive
        gloss loading
    animate growth of gloss text to full size
    //can use any of the effects shown previously:
    //interline expansion, margin callout, or text overlay
when mouse is clicked over a visible anchor or its
    associated gloss text:
    //follow hypertext link
    load_fluid_file(anchor.jumpfile)
when mouse moves away from an anchor or its associated
    gloss text:
    //close all gloss levels that the mouse is no longer
        touching
    for all glosses at levels below the level that the mouse
        is touching:
        animate shrink of gloss text to small size,
        reversing the graphical effect used to show the gloss
            text
        change visibility of all lines of gloss text to invisible
        change anchor underline style to solid
```

As those skilled in the art will understand, various software architectures are suitable for implementing spatial and temporal negotiations necessary for supporting the foregoing described examples of primary bodies of data presenting additional supporting annotations. For example, one contemplated negotiation architecture suitable for use in the negotiation module 36 of FIG. 2 (and in the foregoing illustrated examples of this invention) fluidly takes into account the spatial extent and graphical presentation needs of both the primary and supporting bodies of data. (To more clearly describe them in terms of the architecture, primary and supporting data are sometimes referred to as "fluid objects, "primary or supporting objects" or "parent and child objects." in the following discussion). When a supporting object is called upon for examination, a structured negotiation session occurs between it and a primary object, resulting in a cooperating visual presentation of both. This process is a "negotiation" because neither participant in the exchange has complete control over the layout and presentation decision. The primary object cannot dictate how the supporting object is displayed, nor can the supporting object demand a particular region into which to expand itself. Instead, the participants make requests and proposals based on the information they have of their own layout and presentation needs. The sequence of requests and responses effectively exchange enough information so that a mutually satisfactory situation can be settled upon.

This "fluid" negotiation architecture enables a component model of fluid documents in which different fluid objects can co-exist without being designed specifically to interact with one another. A framework for a hierarchical graphical characteristics language allows fluid objects to gracefully handle requests from other fluid objects that present different or more complex graphical characteristics, determining which fluid objects will be affected, selecting and composing space-making strategies, ensuring salience of the expanded supporting object and protocols for multiple graphical domains, providing a negotiation sequence for resolving space allocation and presentation, and animating the expanding supporting object and the accommodating primary object.

When the user indicates interest in some supporting material (child object, a series of requests and responses are exchanged between the child object and the surrounding primary material (parent object. The sequence is as follows:

1. Intent to expand. The child object contacts its parent, indicating that it would like to expand. It passes along information that describes graphical parameters that the child can control.

2. Initial guidelines. The parent performs a preliminary determination of where the child object should expand and how it should present itself. It does this by considering the likely strategies it will employ to make space for the child. The parent then returns to the child guidelines for presentation.

3. Request space. The child uses the guidelines to calculate how much space it will need when expanded. It is not required to follow the guidelines, but it will attempt to conform if possible. The space request, including the graphical characteristics that the child intends to conform to, is sent to the parent.

4. Offer space. The parent once again considers its strategies for making space, starting with the strategy it most prefers. It tries each in turn, settling on a strategy (or composing multiple strategies) that best satisfies the child's request—the desired size if possible, or else somewhere within the range requested. The strategy may entail cascaded negotiations as the parent petitions its own parent for space.

5. Consider offer. The child object considers the offered space and the graphical conditions attached to the offer. The child object selects a graphical presentation that conforms to the conditions and informs the parent how it chooses to accept the offer. The animation to the newly expanded state is then started.

The following sections examine each step in the negotiation by negotiation module 36 in detail:

Step 1: Intent to Expand

This step simply begins the negotiation. By passing along the graphical characteristics protocol that it adheres to (see next section), the child object informs the parent object about the type of graphical object it is, and thus what presentation capabilities it can accommodate.

Step 2: Initial Guidelines

In general, a child object does not know anything about its parent's presentation. Therefore, it does not initially know if its expanded form will present an effective contrast to the surrounding parent information. The parent object is in charge of communicating guidelines to the child object regarding desired graphical characteristics. For example, if the parent object is a page of text, using the font Times at 12 point, and colored black, it might suggest the following guidelines to an expanding textual annotation: sans-serif font between 10 and 14 point, highly saturated in color. This ensures that the expanded annotation is of comparable size, but is distinct with a different font and a bright color. Child objects try to conform to the guidelines if possible, but they are not constrained to following them. This is the first evidence of negotiation in the architecture—the child object asks its parent for guidelines in preparation for expansion; the parent makes recommendations; the child takes those recommendations under advisement as it prepares its first formal request for space.

The particular language for communicating a fluid object's graphical features, its graphical characteristics protocol, is specific to a class of fluid objects. For example, textual objects such as described in the previous paragraph use a simple protocol similar to the following:

font: {serif|sans-serif|Times|Helvetical . . . }
fontsize: {integer-range}
color: {dark|light|% gray|hue-range| . . . }

During the guidelines phase, protocol components are described as ranges, either quantitatively or qualitatively. By step 5, when the child agrees to a proposed situation, protocol components become specific descriptions of the fluid object's intended presentation, including its size and location.

As will be appreciated, the protocol must be known to both parties of the negotiation. In the simplest case, a fluid object performing as a child object in a negotiation need only know the protocol for its graphical type. However, any fluid object may be confronted with a foreign protocol: parent objects may have children of varying types, and any object may be involved in a negotiation where it is bumped aside by a sibling object of any type.

To handle these situations, protocols can be arranged hierarchically, with protocols lower in the hierarchy acting as strict subsets of those above it in the hierarchy. All protocols descend from a common root, which is the basic protocol that all objects will obey: size and location. In operation, a fluid object confronted with a foreign protocol simply follows the protocol's parent chain until it finds a protocol it knows about. It then communicates using this simpler protocol to suggest guidelines. Because the simpler protocol will not include as many features, the guideline communication will be less rich. In the case where the root protocol must be used, no guidelines are communicated at all; later, only the size and location will be negotiated. Such a protocol hierarchy allows new types of fluid objects to be created and used in existing fluid documents without re-coding. A new fluid object may have graphical parameters that the existing document is not informed about, but the system is likely to still settle upon reasonable presentations.

Step 3: Request Space

Once the child object has the guidelines, it can determine how much it can follow the guidelines, and then create a request for space based on its choice.

For example, say the parent has suggested that the child use a sans-serif font, at 10 to 14 point. However, the child object is a code snippet, and prefers to use Courier, which is a serif font. It selects Courier at 12 point, and then calculates how much space the text of the code snippet will need based on that font face and size. The space is specified as a desired quantity and a minimum and maximum the child could handle. This request implicitly asks for space near the anchor. Alternatively, some protocols allow the space to be specified as an area, with minimum width and minimum height. Textual annotations, for example, can flexibly layout by reflowing across multiple lines. Requesting an area rather than a specific width and height allows the parent more leeway in selecting an effective space.

Step 4: Offer Space

The selected strategy may require the parent to extend or change the guidelines it initially suggested to the child. The initial guidelines were based on a likely guess by the parent; the additional information provided by the child—space and its possible graphical presentation—may change the selected strategy from the one the parent initially anticipated. These conditions are specified in the request specification (based on a graphical characteristics protocol) that is returned to the child. For example, if the parent ends up choosing an overlay strategy, it will ask the child to present itself in a dark color in order to contrast with the light color that the parent will become. Another possibility is that the granted space will not be near the anchor, in which case the parent object alerts the child object that a connection line will be used.

Fluid objects must be able to give space to a child object that wishes to expand. Each fluid object provides its own strategies for coming up with space—that is, they are designed by the developer rather than being part of the architecture. The strategies are not described declaratively; rather, they are procedures that consider how to alter the layout of the fluid object in order to accommodate an expanding child object.

Space-making strategies can be categorized into four categories:

1. Rigid movement. The parent object divides into sections, which rigidly move apart. The child object then can expand into the space in between the sections.
2. Deformation. The parent object divides into sections, which deform in some manner to create space in between the sections. The sections do not increase the size of the bounding box of the parent object by moving apart. The child object expands into the space in between the sections.

Among the many strategies that fall in this category are: interline compression, shrinking the entire text body, curving lines into a "bulge" around the expanding child object, and squashing the characters of the text itself.

3. Overlay. The parent object does not move out of the way; instead, it permits the child object to use some region on top of itself.
4. Outside allocation. The parent object negotiates for space outside of its bounding box for the child object. Other objects must agree to make space for the expanding object by way of rigid movement, deformation and/or overlay.

In the first two cases, rigid movement and deformation, the expanding child object is given empty space in which to display itself. It must make itself salient only in contrast to the nearby parts of the parent object.

In the overlay case, however, the parent and child objects must work together to ensure that the child object is discernible. The graphical characteristics protocol for the object is used to negotiate an acceptable graphical presentation.

Finally, in the outside allocation case, the parent usually must provide some indication of the part of itself to which the child object is anchored. This is often accomplished by drawing a line connecting the anchor and the child object. Routing of these connecting "callout" lines is the responsibility of the parent object, which has the information about its own layout that can be used to best place the line. The foregoing space-making strategies each fluid object has are ordered, from the most preferable strategies (because they result in the most aesthetic or understandable layouts) to the least preferable. Each strategy has limitations on the maximum size it can accommodate. During the negotiation phase, the fluid object evaluates each of the strategies in turn until it finds one that will satisfy the space requirements requested by the expanding child object.

In addition, strategies across and within the categories are composable. If a strategy is marked (by the implementor) as composable, the architecture keeps track of how much space that the strategy would provide. Then it seeks the remaining space requested as it evaluates the next strategy. The ordering of strategies is also used to order the composition of multiple strategies.

A first-order description of a fluid document interaction could simply be "make space for the supporting object to expand into." To accomplish this, the application must decide which other objects must give up the space, and whether that will require yet other objects to relinquish space. The fluid architecture manages this problem by specifying all the fluid objects to be organized in a typical object containment hierarchy. The containment hierarchy partitions the space into nested bounding boxes. A child object C1 which is not expanded will have a bounding box corresponding to its cue, and its own child objects will usually have no spatial presence at all until C1 is expanded. In a simple text annotation application, there is only a root (representing the entire canvas), a primary text object, and a number of child (annotation) objects, which have no children objects of their own.

In order to satisfy a negotiation for space, objects can alter their presentation as necessary within their bounding box. They can also manipulate child objects, as long as the contract that expanded the child object into that position remains the same. (Otherwise another negotiation occurs.) If a negotiation between an object P1 and one of its child objects C1 suggests that the P1 must move or expand its bounding box within its parent's (P2's) region, a further negotiation between P1 and P2 must take place. All such cascaded negotiations can go no further than the root object.

Finally, in some cases negotiation for space will result in an expanded child object moving out of the parent object's bounding box, becoming a sibling of the parent object. This can occur in callout-style fluid expansions, for example.

Step 5: Consider Offer

The final step of the negotiation is for the child to consider the complete proposal from the parent. The proposal includes space, location, and potentially some conditions on its graphical presentation, usually expressed as ranges of acceptable values. It is possible that the child cannot accept the conditions, and must then reject the offer. However, this case is intended to happen only rarely, and usually does not occur because design module 36 follows permissive rather than restrictive negotiation strategies. Thus, although the architecture allows for the possibility of quite specific demands by the parent and the child, in practice most conditions are quite broad and are easily accepted by the fluid objects.

If the child object must reject the offer—for example, if there are a great number of other already expanded child objects taking up the space—it resorts to a non-fluid fallback strategy for presenting itself (for example, opening up in a new window). When the child object accepts the offer, it informs its parent of the precise graphical characteristics it has selected. The parent then finalizes its own strategy and accepts offers from any negotiation it has engaged in with its own parent. As each level of the negotiation is concluded, the information needed to animate each fluid object is collected. These animations are coordinated to ensure that the entire document changes with one smooth motion.

As those skilled in the art will appreciate, other various modifications, extensions, and changes to the foregoing disclosed embodiments of the present invention are contemplated to be within the scope and spirit of the invention as defined in the following claims.

The claimed invention is:

1. A method for presenting a primary body of data displayable on a screen and a supporting body of data relatable to an annotation tag present in the primary body of data, the method comprising the steps of selecting an annotation tag having a predetermined size in the primary body of data, negotiating between the primary body of data and the supporting body of data to determine a space into which the supporting body of data can be fitted while minimizing obstruction of the primary body of data, with the negotiated space being sized larger than the predetermined size of the annotation tag, positioning the supporting body of data in the negotiated space, and generating display data that alters the display characteristics of at least a portion of the primary body of data so that the visual prominence of the at least a portion of the primary body of data in the negotiated space is reduced so that the at least a portion of the primary body of data wilt appear less salient then the supporting body of data.

2. The method of claim 1, further comprising the step of animating an expansion of the annotation tag into the negotiated space.

3. The method of claim 1, further comprising the step of animating a contraction of the supporting body of data positioned in the negotiated space back into the annotation tag.

4. The method of claim 1, wherein the supporting body of data is a user defined handwritten annotation.

5. The method of claim 1, wherein at least one of the primary body of data and the supporting body of data is substantially text.

6. The method of claim 1, wherein at least one of the primary body of data and the supporting body of data is substantially graphics.

7. The method of claim 1, wherein at least one of the primary body of data and the supporting body of data contains both text and graphics.

8. The method of claim 1, wherein the annotation tag is at least a fragment of the supporting body of data.

9. The method of claim 1, wherein the annotation tag is text of the supporting body of data, initially sized to have a smaller typesize than typesize of the primary body of data.

10. The method of claim 1, wherein the annotation tag is a hyperlink to the supporting body of data.

11. A computer controlled display system for displaying a primary body of data on a screen and a supporting body of data relatable to an annotation tag present in the primary body of data, the system comprising:

a selection device for selecting an annotation tag, said annotation tag having a predetermined size in the primary body of data, a first processing element for negotiating between the primary body of data and the supporting body of data a space into which the supporting body of data can be fitted while minimizing obstruction of the primary body of data, with the negotiated space being sized larger than the predetermined size of the annotation tag, and a second processing element for positioning the supporting body of data in the negotiated space for display on the screen and generating display data that alters the display characteristics of at least a portion of the primary body of data so that the visual prominence of the at least a portion of the primary body of data in the negotiated space is reduced so that it will appear less salient then the supporting body of data.

* * * * *